United States Patent Office 2,918,508
Patented Dec. 22, 1959

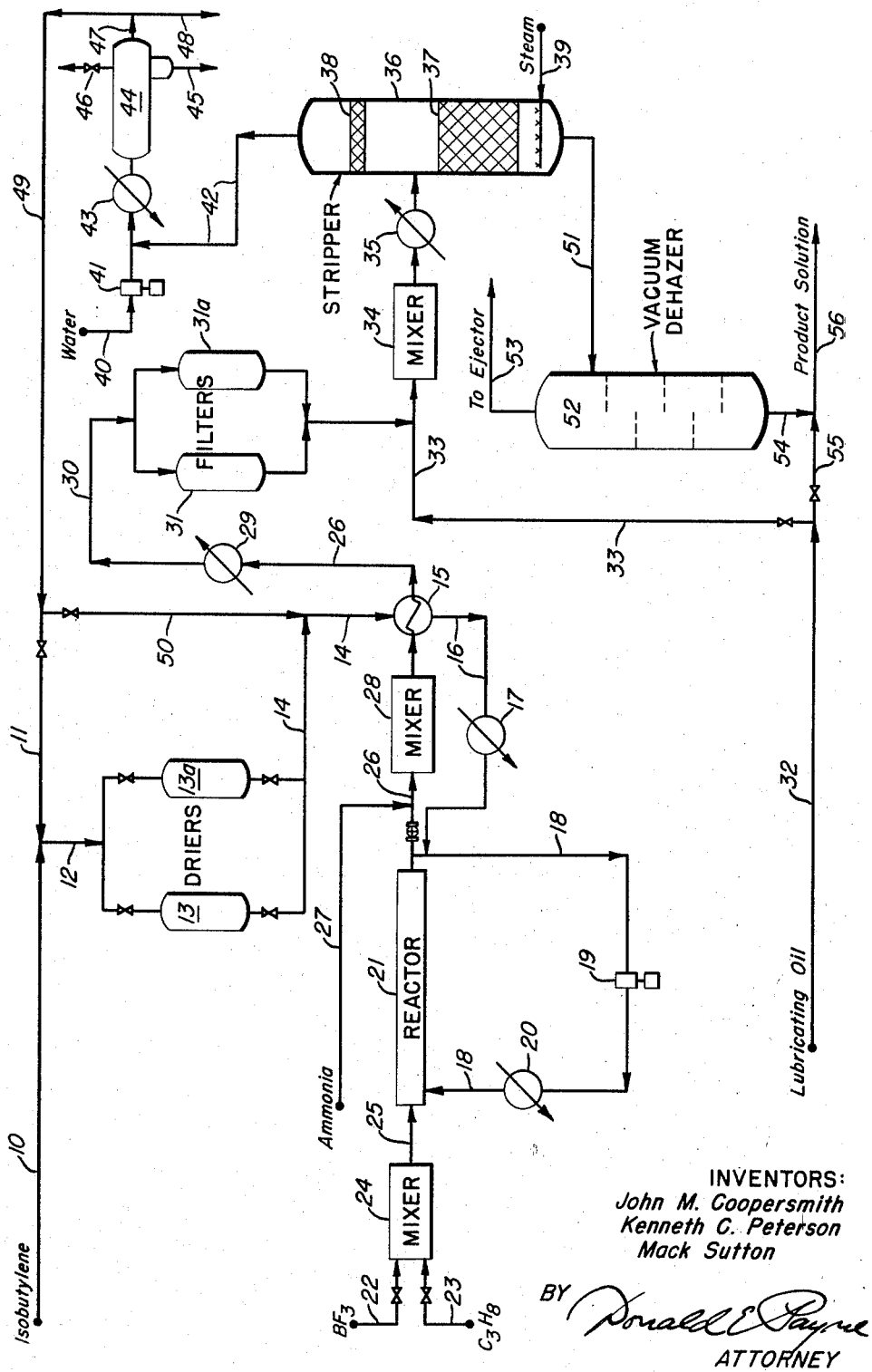

2,918,508

POLYISOBUTYLENE PRODUCTION

John M. Coppersmith, Park Forest, and Kenneth C. Peterson, Chicago, Ill., and Mack Sutton, Valparaiso, Ind., assignors to Standard Oil Company, Chicago, Ill., a corporation of Indiana Application December 2, 1957, Serial No. 700,199

9 Claims. (Cl. 260—683.15)

This invention relates to polyisobutylene production and it pertains more particularly to an improved commercial system and technique for converting isobutylene into viscous or resinous high molecular weight polymers suitable for addition to lubricating oils in order to improve viscosity index properties thereof.

It has long been known that isobutylene can be polymerized into high molecular weight liquid polymers by the use of Friedel-Crafts type catalysts such as aluminum chloride and boron fluoride. The object of this invention is to provide a practical commercial isobutylene polymerization plant and technique which are vast improvements over those previously known. A particular object is to simplify the reaction and refrigeration portions of the system, to provide for more precise molecular weight or viscosity control than was possible in prior systems and to minimize corrosion problems thereby avoiding the necessity of using expensive alloys. In short, the object is to minimize construction and operating costs while maximizing product yield and quality. Other objects will be apparent as the detailed description of the invention proceeds.

In practicing the invention we dispense with the use of a solvent or diluent and employ substantially pure isobutylene as a charge. We employ as a reactor a simple pipe or conduit which may be about 2 inches inside diameter and 6 feet long in a plant for polymerizing about 75 barrels per day of isobutylene with a conversion factor of about 95 percent. The reactor is not refrigerated since we have found that polymerization is substantially complete in about a half second. About 2 to 20, preferably about 5, parts by weights of the reactor effluent are recycled with incoming charge for each part by weight of reactor effluent withdrawn, the recycled material, with added fresh feed, is cooled in a refrigerated cooler to a temperature of about 0 to —70° F., preferably —20 to —60° F., and the extent of polymerization is controlled by regulating the amount of boron fluoride that is introduced into the reaction zone, said amount being in the range of about .02 to 1 weight percent, preferably about .1 to .3 or about .2 weight percent based on fresh isobutylene charged. The boron fluoride is preferably introduced in about 5 to 10 volumes of gaseous propane, Freon or other dispersing medium in order to obtain uniform contacting thereof with the undiluted isobutylene. The amount of boron fluoride introduced is preferably limited to obtain about 1 to 4 percent conversion per pass based on fresh feed and to limit the temperature rise to about 3 to 30° F., preferably about 5 to 20° F. The reactor effluent is diluted with incoming isobutylene to avoid polymerization at undesirably high temperatures, for example in product effluent recycle lines.

To the small aliquot stream of reactor effluent which is not recycled a molar excess of ammonia is added in order to further quench the reaction and the liquid stream, which may contain about 10 percent of polymer dissolved in isobutylene, is heated, filtered to remove $BF_3$-ammonia complex, mixed with a light lubricating oil, freed from normally gaseous and low boiling hydrocarbons in a stripping zone and finally dehazed in a vacuum tower before being blended with additional lubricating oil. The major portion of the hydrocarbons removed in the stripping zone may be recycled for maximum utilization of isobutylene and the expression "substantially pure" is intended to encompass the use of recycled hydrocarbons even though the total hydrocarbon stream introduced into the reactor may contain 10 to 20 percent or more of hydrocarbons other than isobutylene.

Our polymer product is useful for many purposes but its outstanding utility is as an additive for lubricating oils for improving four important engine-performance characteristics, namely motor oil mileage, gasoline mileage, cold starting, and octane-requirement increase. Our preferred polymer product has an intrinsic viscosity of about .75 to .85 and is superior to available polybutenes for improving the specified motor oil characteristics. The amount of polymer, which is usually employed and marketed as a concentrate in light lubricating oil, to be added to any given motor oil is well known to those skilled in the art and requires no further description.

The invention will be more clearly understood from the following detailed description of a specific example thereof read in conjunction with the accompanying drawing which forms a part of this specification and which is a schematic flowsheet of our isobutylene polymerization plant.

In this example about 75 barrels per day (2.2 gallons per minute or 650 pounds per hour) of substantially pure isobutlylene is introduced by line 10 and admixed with about 4600 pounds per hour of recycled isobutylene (and about 900 pounds per hour of butenes, etc.) from line 11 are passed through line 12 and one of the dryers 13 or 13a and thence through line 14, heat exchanger 15, line 16 and cooler 17 into line 18 as close to the product takeoff as is practicable, the incoming isobutlylene being cooled in cooler 17 to about the reactor outlet temperature. About 80 percent to 90 percent of the diluted reactor effluent, about 24,640 pounds per hour in this example, is passed through line 18, recycle pump 19, and refrigerated cooler 20 to reactor 21. About 1.4 pound per hour of boron fluoride is introduced by line 22 and about 8 pounds per hour of propane is introduced through line 23, the boron fluoride being mixed with the propane in mixer 24 and the mixture being introduced into the reactor by line 25. The reactor in this case is a simple pipe about 2 inches in diameter by 6 feet in length. It is operated at an inlet pressure of about 185 p.s.i.g., an outlet pressure of about 85 p.s.i.g., an inlet temperature of about —40° F. and an outlet temperature of about —30° F. with an isobutylene residence time in the reactor of about ½ second. Dilution of reactor effluent with incoming isobutylene reduces the percentage if catalyst in the total stream so that polymerization is substantially stopped or quenched. About 6150 pounds per hour of the diluted product stream is continuously withdrawn through line 26 and the reaction in this stream is quenched by anhydrous ammonia which is introduced through line 27 in an amount which is a molar excess over the amount of $BF_3$ in the exit stream, the ammonia in this example being introduced at the rate of about .52 pound per hour and thoroughly mixed with the exit stream in mixer 28. In this example the conversion per pass is 2 percent, the reactor charge conversion factor is 10 percent and the conversion factor on fresh isobutylene is about 95 percent. A typical charge is 99.3 weight percent isobutylene, .3 weight per cent butenes and .3 weight percent butanes, the other .1 percent constituting minor impurities. The boron trifluoride in this example is 99.5 percent pure and the propane is a natural grade containing less than 1 percent of other hydrocarbons.

The withdrawn product stream is warmed from about −30 to +35° F. in exchanger 15 and it is further heated to about 100° F. in heater 29 before being passed by line 30 through one of the filters 31 or 31a wherein precipitated $NH_3$—$BF_3$ complex is filtered out of the approximately 10 percent polymer solution in isobutylene by means of celite or other suitable filtering material. The filtrate is admixed with about 260 barrels per day of a 5W base oil from lines 32 and 33, the polymer solution being intimately admixed with the oil in mixer 34 for effecting solution of polymer therein. The solution is then passed through heater 35 and introduced into stripping column 36 which is provided with suitable packing material 37 at its base and an entrainment arrester 38 in its upper part, the stripping being effected by live steam introduced by line 39. Water from line 40 is pumped by pump 41 for admixture with vapors leaving stripper 36 through line 42, the aqueous stream being cooled in cooler 43 and then introduced into separator 44 from which an ammoniacal water layer is withdrawn through line 45. A vent 46 is provided for discharging propane or any other uncondensed gases. Hydrocarbons are withdrawn through line 47, a minor part being vented through line 48 and the major part being returned by line 49 and line 11 as hereinabove described. If desired the recycled hydrocarbons may be passed through line 50 to line 14 thereby by-passing dryers 13 and 13a.

The stripped oil solution of isobutylene polymer is next introduced by line 51 into vacuum dehazing tower 52 which is maintained at a pressure of about 50 millimeters of mercury absolute by withdrawing vapors through evacuation line 53 by means of an ejector or vacuum pump. The dehazed product stream is withdrawn through line 54 and, if desired, it may be blended with additional oil from line 55 before being removed from the system through line 56.

The finished product in this example contains about 16 percent by weight of polymer. In the polymerization reactor there is a shrinkage factor (barrels of polymer per barrel of isobutylene reacted) of about .65. The product in this example has a viscosity of about 650 centistokes at 210° F., a color of 1½ to 2 NPA (bright and clear) and a flash point higher than 360° F.

The multi-pass system hereinabove described with recycle cooling is much easier to control than a once-through system with multiple $BF_3$ injection points. By avoiding the use of a separate solvent or diluent, we minimize catalyst requirements and effect enormous savings in construction and operating costs. Cleanup of polymer is simplified. For obtaining a polymer of given intrinsic viscosity, temperatures may be 10 to 30° F. higher in our process than were heretofore required in a batch process or in a process employing diluent.

The polymerization reaction is controlled by regulating the reaction temperature, the rate of catalyst addition and/or the rate of fresh feed addition. A threshhold catalyst concentration exists which increases as the reaction temperature is lowered and which must be exceeded in order to obtain polymerization. In our system the amount of $BF_3$ in line 18 is maintained below this threshhold limit so that no appreciable amounts of polymerization will be effected in line 18. Obviously, the amount of $BF_3$ introduced through line 25 must be just sufficient to obtain the desired polymerization and should be sufficiently small so that when the reactor effluent in line 18 is diluted with at least a part of the incoming isobutylene, the polymerization may be substantially quenched. If only a part of the incoming isobutylene is introduced through line 16 to line 18, the remainder thereof may be passed by a line (not shown) directly to the outlet end of the reaction.

The nozzles for injecting $BF_3$ into the reactor are preferably tipped with elastomer material which is inert in the environment, examples of such elastomers being synthetic rubber (neoprene), natural gum rubber, tetrafluoroethylene polymer (Teflon), or the like, such elastomer material being perforated so that it will open under sufficient $BF_3$ pressure but close as a check valve under diminished $BF_3$ pressure.

A run in the manner substantially as hereinabove described at a temperature of about −25° F. with a recycle ratio of 10:1 gave a conversion of about 6 to 7 percent and a product with an intrinsic viscosity of .65 to .85. Other olefins such as propylene (at −50° F.), alphamethylstyrene (at +13° F.), normal butene (at −25° F.) and mixed normal and isobutenes (at −30° F.) have been polymerized with $BF_3$ in a flowing reactor of the type hereinabove described; for optimum conversions and yields in the case of olefins other than isobutylene, the nature and amount of catalyst and operating conditions may be modified but the general principles of our invention are applicable thereto.

While a specific example of our invention has been described in considerable detail, it should be understood that various modifications and alternative arrangements and conditions will be apparent from the foregoing description to those skilled in the art.

We claim:

1. The method of polymerizing isobutylene which comprises cooling isobutylene to a polymerization temperature in the range of −20 to −60° F. in a cooling zone and introducing cooled isobutylene together with an amount of $BF_3$ for effecting a conversion of about 1 to 4 percent per pass into a conversion zone, recycling the major part of the conversion zone effluent with its dissolved $BF_3$ and with additional charge through said cooling zone back to said conversion zone, withdrawing a minor part of the conversion zone effluent as a net product stream, converting residual $BF_3$ in said stream to form an adduct and removing said adduct from the remaining solution of polymer in unconverted isobutylene, adding an oil of lubricating viscosity to said solution, stripping light hydrocarbons from the resulting mixture and returning most of the stripped hydrocarbons to the conversion zone.

2. The method of claim 1 where the conversion zone is a conduit providing a residence time of less than 1 second, a pressure drop in the range of about 50 to 100 p.s.i. and a temperature rise of about 3 to 30° F.

3. The method of claim 1 which includes the step of adding an amount of $BF_3$ to obtain a conversion of about 2 percent per pass based on fresh isobutylene charge and wherein the major part of the conversion zone effluent is about 5 times the amount on a weight basis of the minor part of conversion zone effluent.

4. The method of polymerizing isobutylene which comprises charging fresh, substantially pure isobutylene to a recycle conversion system including a cooling zone and a conversion zone, introducing an amount of $BF_3$ in the conversion zone which is about .02 to 1 percent by weight based on fresh isobutylene charge and is sufficient to exceed the threshhold level for obtaining polymerization, recycling from the reaction zone outlet back through the cooling zone to the reaction zone inlet about 5 to 15 times as much of the $BF_3$-containing reaction zone effluent as is withdrawn as net product stream, adding to the recycled material ahead of said cooling zone sufficient isobutylene to reduce the $BF_3$ concentration in total materials passed through said cooling zone below the threshhold level for obtaining polymerization, recovering isobutylene from said net product stream and recycling substantially more isobutylene than the amount of isobutylene introduced as fresh charge.

5. The method of polymerizing isobutylene, which method comprises charging said isobutylene in substantially undiluted form to a recycle conversion system including a cooling zone and a conversion zone, introducing an amount of $BF_3$ at the inlet of the conversion zone which is sufficient to effect polymerization, diluting the conversion zone effluent with an amount of incoming olefin charge to substantially stop the polymerization reaction, recycling about 2 to 20 parts of the diluted conversion zone effluent through the cooling zone back to the conversion zone for each part of diluted conversion zone effluent which is withdrawn for product recovery, mixing ammonia with that part of diluted conversion zone effluent which is withdrawn for product recovery, warming the resulting mixture and filtering it to remove ammonia-$BF_3$ complex from filtrate, mixing an oil of lubricating viscosity with the filtrate, stripping the resulting mixture to remove isobutylene therefrom, separating ammonia from removed isobutylene and recycling at least a part of the removed, ammonia-free isobutylene to the recycle conversion system.

6. The method of polymerizing isobutylene which comprises continuously introducing isobutylene at a temperature in the range of 0 to —70° F. at the inlet end of a reaction zone, continuously injecting at the inlet end of the reaction zone an amount of $BF_3$ which is just above the threshhold level for obtaining polymerization, holding the isobutylene and catalyst in the reaction zone for a period of time less than about 1 second for obtaining polymerization with a temperature rise across the reaction zone in the range of about 3 to 30° F., adding sufficient isobutylene at the discharge end of the reaction zone to decrease the percent of $BF_3$ in diluted reaction zone effluent to a level below the threshhold level and continuously recycling a substantial amount of the diluted reaction zone effluent through a cooling zone back to the reaction zone inlet.

7. An olefin polymerization system which comprises a reactor, a line communicating with the discharge end of said reactor for introducing incoming undiluted olefin and obtaining diluted reactor effluent, a line for removing a small amount of the diluted reactor effluent from the reactor for product recovery, a cooler, a pump, connections for recycling most of the reactor effluent by the pump through the cooler back to the inlet end of the reactor, inlet connections for introducing $BF_3$ at the inlet end of the reactor, means for drying incoming isobutylene, means for mixing ammonia with the small amount of diluted reactor effluent which is withdrawn for product recovery, means for removing ammonia-$BF_3$ complex from said effluent, means for mixing the remaining effluent with oil of lubricating viscosity, means for removing isobutylene from oil-polymer mixture and means for recycling the last named isobutylene to the reactor.

8. The system of claim 7 wherein the inlet connections for introducing $BF_3$ are tipped with elastomer material which is inert in the environment.

9. The system of claim 7 which includes means for dehazing the oil-polymer mixture after isobutylene is stripped therefrom.

References Cited in the file of this patent

UNITED STATES PATENTS

| | | |
|---|---|---|
| 2,363,221 | Bannon | Nov. 21, 1944 |
| 2,366,171 | Belchetz et al. | Jan. 2, 1945 |
| 2,508,744 | Carlson et al. | May 23, 1950 |
| 2,559,984 | Montgomery et al. | July 10, 1951 |
| 2,628,991 | Schneider et al. | Feb. 17, 1953 |

UNITED STATES PATENT OFFICE

CERTIFICATE OF CORRECTION

Patent No. 2,918,508 December 22, 1959

John M. Coopersmith et al.

It is hereby certified that error appears in the above numbered patent requiring correction and that the said Letters Patent should read as corrected below.

In the grant, line 1, and in the heading to the printed specification, line 3, name of first inventor, for "John M. Coppersmith", each occurrence, read -- John M. Coopersmith --.

Signed and sealed this 12th day of July 1960.

(SEAL)
Attest:

KARL H. AXLINE
Attesting Officer

ROBERT C. WATSON
Commissioner of Patents